United States Patent [19]

Rütschle et al.

[11] Patent Number: 5,474,514
[45] Date of Patent: Dec. 12, 1995

[54] METHOD AND MACHINE TOOL FOR CHANGING TOOLS

[75] Inventors: Engen Rütschle, Mühlheim; Hans-Henning Winkler, Tuttlingen, both of Germany

[73] Assignee: Chiron-Werke GmbH & Co. KG, Germany

[21] Appl. No.: 189,918

[22] Filed: Feb. 1, 1994

[30] Foreign Application Priority Data

Feb. 13, 1993 [DE] Germany .......................... 43 04 361.5

[51] Int. Cl.⁶ .................................................. B23Q 3/157
[52] U.S. Cl. .................................................. 483/1; 483/64
[58] Field of Search ................................ 483/1, 63, 67, 483/30, 54–58, 66; 211/1.56, 1.52, 70.6

[56] References Cited

U.S. PATENT DOCUMENTS

| | | | |
|---|---|---|---|
| 3,466,740 | 9/1969 | Harman | 483/64 X |
| 4,119,213 | 10/1978 | Sato et al. | 483/63 X |
| 4,893,399 | 1/1990 | Hammer | 483/64 X |
| 4,920,632 | 5/1990 | Babel | 483/64 |

FOREIGN PATENT DOCUMENTS

| | | | |
|---|---|---|---|
| 219708 | 3/1985 | Germany | 483/64 |
| 0243537A2 | 11/1986 | Germany . | |
| 3644024 | 6/1988 | Germany | 483/63 |
| 3817256 | 11/1989 | Germany . | |
| 4033036A1 | 1/1992 | Germany . | |
| 157934 | 12/1981 | Japan | 483/64 |
| 194847 | 11/1982 | Japan | 483/64 |
| 217241 | 12/1983 | Japan | 483/64 |
| 24934 | 2/1984 | Japan | 483/64 |
| 86151 | 5/1986 | Japan | 483/1 |
| 1425030 | 9/1988 | U.S.S.R. | 483/64 |

Primary Examiner—William Briggs
Attorney, Agent, or Firm—Pretty, Schroeder, Brueggemann & Clark

[57] ABSTRACT

A machine magazine to receive a plurality of tools that can be moved in a first transport direction is associated with a machine tool. Also provided is a changing magazine to receive a plurality of tools that can be moved in a second transport direction, which tools are to be inserted into or removed from the machine magazine. A transfer apparatus for changing tools between the machine magazine and the changing magazine is also provided. In the machine tool, the first and the second transport directions are opposite to one another. A method for tool changing that is implemented on the machine tool is also described.

6 Claims, 4 Drawing Sheets

METHOD AND MACHINE TOOL FOR CHANGING TOOLS

The present invention concerns a method for changing tools between a machine magazine associated with a machine tool and a changing magazine, in which the machine magazine receives a plurality of tools that can be moved in a first transport direction and the changing magazine receives a plurality of tools that can be moved in a second transport direction, which tools are to be inserted into or removed from the machine magazine; and in which a transfer apparatus changes the tools between the machine magazine and the changing magazine.

The invention further concerns a machine tool with an associated tool magazine to receive a plurality of tools that can be moved in a first transport direction and a changing magazine to receive a plurality of tools that can be moved in a second transport direction, which tools are to be inserted into or removed from the machine magazine; and with at least one transfer apparatus for changing tools between the machine magazine and the changing magazine.

Tool-changing methods of this kind, as well as corresponding tool magazines for implementing the method, are known from DE-OS 38 17 256 and EP-A-0 243 537.

In the known machine tools, the machine magazine receives the tools that are required for the machining step being performed at the time. Such machine tools, also called "machining centers," perform a series of different working steps on a single workpiece in succession, for which various tools are required.

The storage capacity of such a machine magazine cannot, however, be expanded without limit, since as a result the average transport distance for a tool from its current position in the machine magazine to the operating position becomes longer and longer. This, however, impairs the average working time of the machine tool.

It must also be remembered that, especially when such a machine tool is operated for long periods, the tools must be removed at specific intervals due to wear. A tool change may also be necessary if a different machining procedure is desired.

For this purpose, the aforesaid machine tools possess a changing magazine that is independent of the machine tool and is brought in whenever required. The retooling time of the known machine tool then depends on how quickly the tools can be removed from the machine magazine, and the new tools can be inserted from the changing magazine into the machine magazine.

In the machine tool known from the aforementioned EP-A-0 243 537, two changing magazines, which circulate synchronously with and in the same direction as the machine magazine, are provided for this purpose. The first changing magazine withdraws the tools from the machine magazine while the second changing magazine is stocked with new tools inserts them into the machine magazine. The known machine tool has a very complex design, not only because two changing magazines are needed so that insertion and removal can occur simultaneously, but also because two transfer stations are required between the changing magazines and the machine magazine.

In the tool magazine known from DE-OS 38 17 256, only one changing station with one changing magazine, which circulates synchronously with and in the same direction as the machine magazine, is provided. First an empty changing magazine is brought to the transfer position, whereupon the tools are removed from the machine magazine in the manner of a zip fastener. Then the changing magazine is exchanged for a new changing magazine with tools for insertion. These new tools are then, in a second changing sequence, inserted into the machine magazine in the manner of a zip fastener.

Although only one transfer position between machine magazine and changing magazine is needed with this machine tool, two different changing magazines are nevertheless still required. In addition to the resulting extreme design complexity, the method known from DE-OS 38 17 256 is also very time-consuming, since first the tools must be removed from the machine magazine before tools can then be inserted back into the machine magazine from a fresh changing magazine that must be brought in.

In summary, therefore, it is known to use changing magazines circulating synchronously with the machine magazine, with separate changing magazines being required in each case for removing and for inserting tools.

On this basis, it is an object of the present invention to develop a method and a machine tool of the aforesaid kind in such a way that the aforementioned disadvantages are eliminated. In particular, the new machine tool and the new method are intended to make possible a rapid tool change with no need for physically complex or redundant features.

With reference to the aforesaid method, this object is achieved by the fact that for tool changing, the tools are moved in opposite directions in the machine magazine and in the changing magazine.

With reference to the aforesaid machine tool, this object is achieved by the fact that the first and the second transport directions are opposite to one another.

The underlying object of the invention is entirely achieved in this manner. Because the machine magazine and changing magazine move in opposite directions, only one changing magazine is needed with the new machine tool. Specifically, the empty place created in the machine magazine by the removal of a tool into the changing magazine arrives, as the two magazines are moved further, opposite a tool in the changing magazine that is to be inserted, and can immediately be refilled with that tool. Thus the empty space "alternates," so to speak, cyclically between the machine magazine and the changing magazine. In addition to the physical simplification that only a single changing magazine is required, this method can be implemented extremely quickly.

With the new machine tool it is preferred if the transfer apparatus comprises at least one tool changer that changes one tool at a time between the machine magazine and the changing magazine, and if at least one empty space for a tool being changed is provided in the machine magazine or in the changing magazine before tool changing begins.

With regard to this feature it is advantageous that a simple tool changer can be used, in the form of a slider which slides the tools from one magazine into the other. Because an empty space is provided in the changing magazine, the machine magazine can be fully utilized. All storage spaces in the machine magazine can be occupied by tools, but a faster and simpler tool change between the machine magazine and changing magazine is nevertheless possible. It is not necessary to use a complex double changer that simultaneously takes one tool from both magazines and, following a corresponding pivoting apparatus, inserts it into the respective other magazine. This again results in a simpler design for the new machine tool.

With the new machine tool it is also preferred if the transfer apparatus comprises two tool changers, each of which changes one tool at a time between the machine magazine and the changing magazine; and if a total of at least two empty spaces for tools being changed are provided in the machine magazine and the changing magazine before tool changing begins.

With regard to this feature it is advantageous that the machine magazine can initially be completely occupied by tools. Then in a first step a tool is removed from the machine magazine, so that then one empty space is present both in the machine magazine and in the changing magazine. The two tool changers then each change one tool out of one magazine into the other magazine, simultaneously and in opposite directions. After the two magazines have moved in opposite directions, the two empty spaces are once again located opposite tools in the respective other magazine, which can be changed by simultaneous actuation of the two tool changers. This feature therefore offers the advantage that changing time is greatly reduced as compared with the machine having only one tool changer and one empty space. Not only are two tools are changed simultaneously, but also both magazines can be moved simultaneously in opposite directions, so that tool changing time can be reduced by a factor of almost four.

With the new machine tool it is preferable, moreover, if the transfer apparatus possesses magazine switches by means of which the machine magazine and changing magazine can be connected in series for tool changing.

The advantage of this feature is that no further tool changers at all are needed, so that the design complexity can be kept low. The magazine switches then connect the two magazines in series so that when the tools in the two magazines are moved in opposite directions, the queue of tools runs from the machine magazine into the changing magazine and vice versa. In this manner the changing process is once again considerably accelerated, since once the magazine switches have been connected, tool changing occurs in the normal transport rhythm of the two magazines. This therefore eliminates the time needed by the tool changer or changers for tool changing in each case. Depending on the total number of tools accommodated in the machine magazine, this therefore results in a drastic reduction in tool changing time.

In general it is preferred if the tools in the machine magazine and the changing magazine are moved either alternately stepwise, or simultaneously.

These features, among others, are to be viewed in conjunction with the apparatus of one or two tool changers. The advantage resulting from both features is that the empty space remains in position, so to speak, during the entire tool change, meaning that it does not migrate along the magazine. This means that one very simple tool changer or two very simple tool changers, which need to be configured simply as stationary sliders, can be provided. Not only does this have design advantages, but the use of a simple slider, which merely pushes tools from one magazine into the other, also results in a very short tool changing time.

With the new method it is preferred if at least one empty space for a tool being changed is present in one magazine of the machine magazine or the changing magazine, and if the following steps are performed cyclically for tool changing:

a) Change one tool into the empty space in one magazine;
 b) Move the tools in the machine magazine or changing magazine one space over;
 c) Change one tool from one magazine into the empty space now available in the other magazine; and
 d) Move the tools in the changing magazine or machine magazine one space over.

An advantage of this method is that the empty space does not migrate along one of the two magazines, but alternates between the two magazines, always in the same position.

The entire exchange of tools between the machine magazine and the changing magazine thus takes place in the rhythm of tool changing and of the movement of tools into the magazines. This method not only requires very little physical complexity, but can also be implemented very quickly, since only one changing magazine with one empty space is necessary.

With the new method it is also preferable if at least one empty space for a tool being inserted is present in both the machine magazine and in the changing magazine, and if the following steps are performed cyclically for tool changing:

a) Change one tool into each empty space of the respective other magazine; and
 b) Move the tools in the machine magazine and the changing magazine in opposite directions, each one space over.

As already described above in conjunction with the new machine tool, these features reduce the total tool changing time to approximately a quarter of the time required with the method using one empty space.

With the new method it is furthermore advantageous if the transfer apparatus for tool changing temporarily connects the machine magazine and the changing magazine in series, and if the tools in the machine magazine and the changing magazine are moved simultaneously but in opposite directions.

The advantage of this feature has already been discussed in conjunction with the magazine switches provided for the new machine tool. Once the two magazines have been "connected in series," the tools can be moved out of the machine magazine into the changing magazine, and simultaneously the new tools can be moved out of the changing magazine into the machine magazine. This also requires that the tools in the two magazines be moved in opposite directions to one another.

Overall, the new machine tool and the new method for tool changing offer first of all the design advantage that only one changing magazine is required for both insertion and removal. Moreover there is a time advantage in the time required to retool the new machine tool from one set of tools to another, since because of the various features just described the tool changing time is reduced by features which include the fact that tools can be inserted and removed simultaneously.

Further advantages are evident from the description and the attached drawings.

It is understood that the features mentioned above and those yet to be explained below can be used not only in the respective combinations indicated, but also in other combinations or in isolation, without leaving the context of the present invention.

An exemplary embodiment of the invention is depicted in the drawings and will be explained further in the description which follows. In the drawings.

Figure 1:
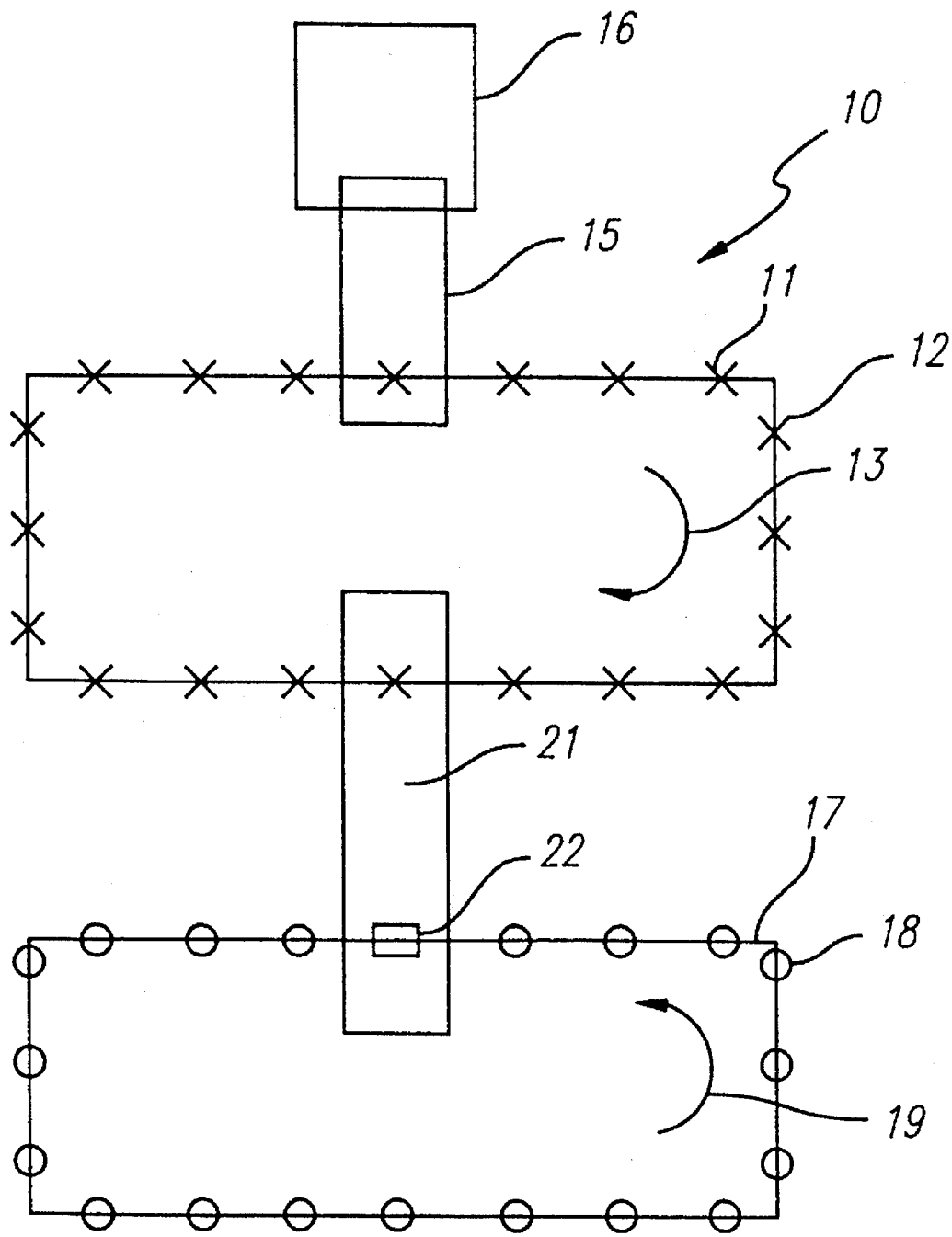
FIG. 1 shows a schematic depiction of the new machine tool with associated changing magazine.
Figure 2A:
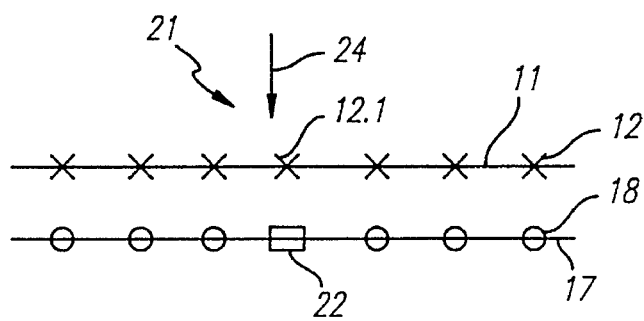
FIG. 2 shows a schematic depiction of the tool changing sequence with the machine tool from FIG. 1, with one tool changer provided.
Figure 2B:
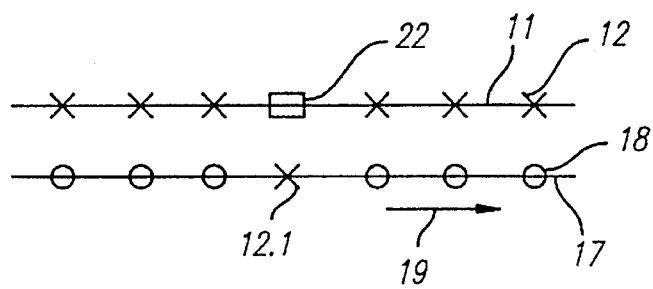
Figure 2C:
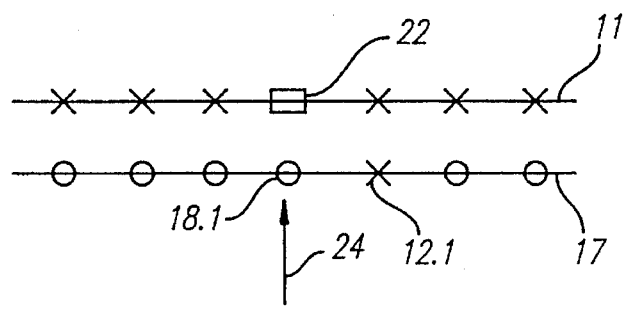
Figure 2D:
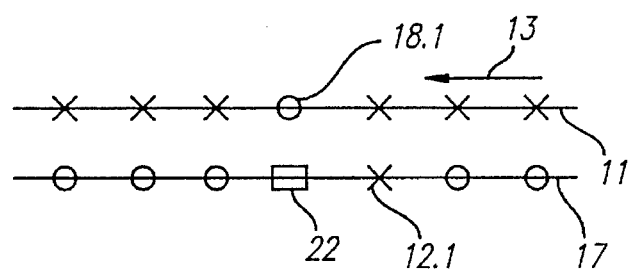
Figure 2E:
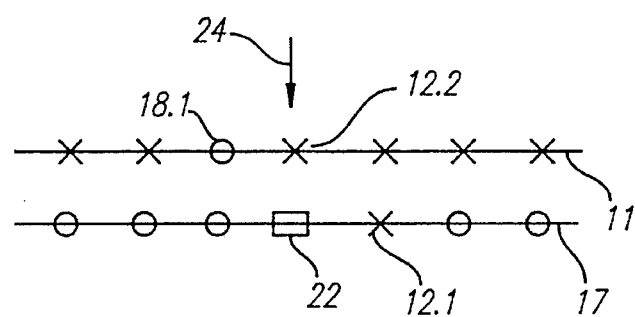
Figure 3A:
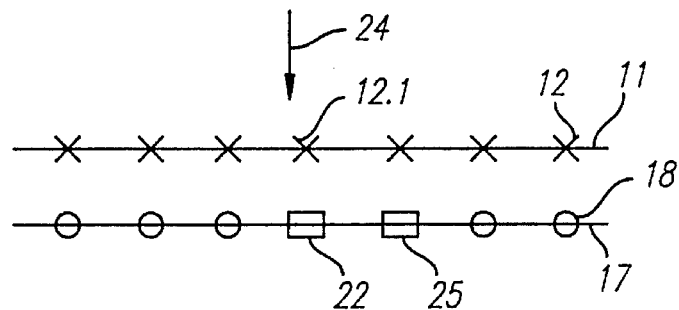
FIG. 3 shows, in a depiction like that of FIG. 2, the sequence for two tool changers.
Figure 3B:
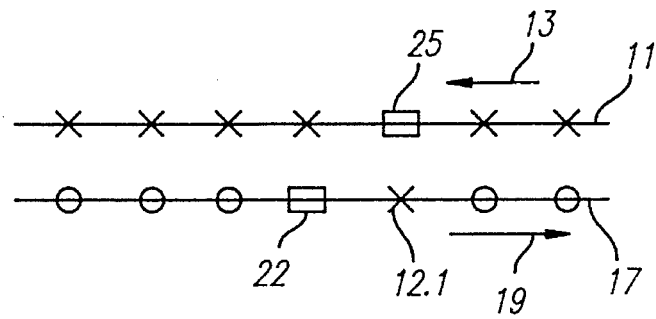
Figure 3C:
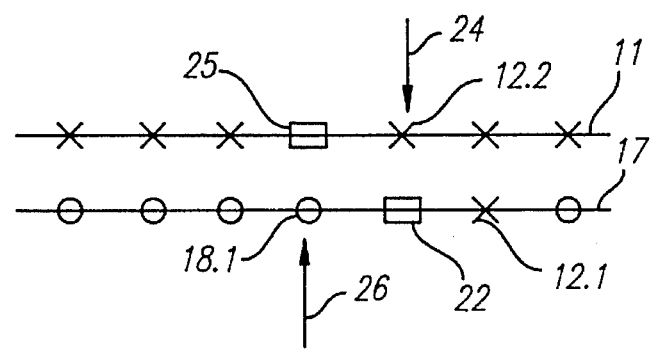
Figure 3D:
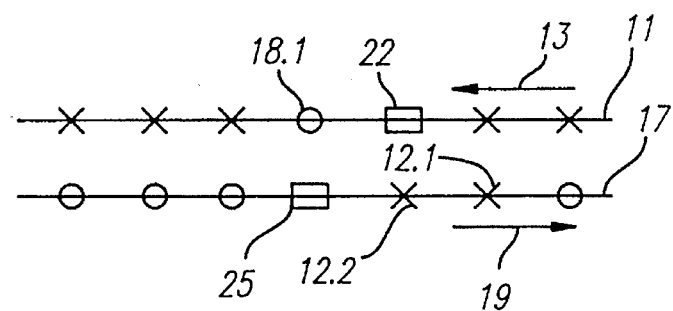

FIG. 1 depicts a schematic plan view of a machine tool 10 with which a machine magazine 11 is associated. Tools 12 that are moved in the machine magazine 11 in a first transport direction indicated at 13 are stored in the machine magazine 11.

The machine tool 10 further has a changing apparatus 15 with which the tools 12 are inserted from the machine magazine 11 into a working spindle (not depicted in FIG. 1), that is indicated in FIG. 1 simply as a spindle nose 16.

The various tools 12 from the machine magazine 11 are inserted by means of the changing apparatus 15 into the spindle as required. Storage space in the machine magazine 11 is limited, however; in the exemplary embodiment shown, the machine magazine 11 can store a total of twenty tools 12. When the machine tool 10 needs to be retooled for a new machining procedure, or when the tools 12 become worn due to long-term use, the tools 12 must be removed.

Associated with the machine tool 10 for this purpose is a changing magazine 17 in which the tools 18 for insertion are arranged. The tools 18 in the changing magazine 17 are moved in a second transport direction indicated at 19.

Provided between the machine magazine 11 and the changing magazine 17 is a transfer apparatus 21 which removes the tools 12 from the machine magazine 11 into the changing magazine 17, and simultaneous removes the tools 18 from the changing magazine 17 into the machine magazine 11. In a first exemplary embodiment, one empty space 22 is provided for this purpose in the changing magazine 17, so that the changing magazine 17 has a total of twenty-one storage spaces.

The tool changing method to be implemented on the machine tool 10 will now be described with reference to FIG. 2 in a first exemplary embodiment:

FIG. 2 a) shows, in a partial view, the status of the machine tool 10 as depicted in FIG. 1. Here the transfer apparatus 21 comprises a schematically depicted tool changer 24 that is indicated by an arrow.

In the first step a), the tool changer 24 pushes the tool 12.1 to be removed out of the machine magazine 11 into the empty space 22 provided in the changing magazine 17.

In the next step b), the changing magazine 17 is moved in its transport direction 19 one step over, so that the empty space 22 now present in the machine magazine 11 arrives opposite a tool 18.1 to be inserted. In step c) the tool changer 24 then pushes the tool 18.1 to be inserted out of the changing magazine 17 into the machine magazine 11, so that the empty space 22 shifts back into the changing magazine 17. This status is shown under step d).

The machine magazine 11 is now moved in the opposite direction from transport direction 19, namely in its transport direction 13, so that the tool 12.2 to be removed arrives opposite the empty space 22 which is now once again present in the changing magazine 17. In step e) the tool 12.2 is then pushed by the tool changer 24 into the changing magazine 17 so that the sequence begins again cyclically at a).

It is evident from the above that as a result of stepwise, alternating movement of the two magazines 11 and 17 in opposite directions, the empty space 22 always remains at the level of the tool changer 24, but changes cyclically between the machine magazine 11 and the changing magazine 17. As a result of the process just described, the tools 12 migrate out of the machine magazine 11 into the changing magazine 17, and there move in the second transport direction 19. Conversely, the tools 18 to be inserted migrate out of the changing magazine 17 into the machine magazine 11, and there are moved in the transport direction 13.

FIG. 3 describes, in a second exemplary embodiment, an implementation of the new method with a second empty space 25 and a second tool changer 26.

FIG. 3 a) describes the status in which the changing magazine 17 with the two empty spaces 22 and 25 has been brought up to the machine magazine 11, which is still full. In a first step, the tool changer 24 then pushes the tool 12.1 into the empty space 25, so that one empty space 22 and 25 is now present in each of the two magazines 11 and 12.

In step b) the machine magazine 11 is then moved in the transport direction 13, and simultaneously the changing magazine is moved in the opposite direction in transport direction 19, each by one step. This leads to the status depicted under step c), in which the empty space 22 arrives opposite the tool 12.2 to be removed, and the empty space 25 is opposite the tool 18.1 to be inserted. The two tool changers 24 and 26 are then actuated, pushing the tools 12.2 and 18.1 into the respective other magazine.

Empty space 22 thus moves into the machine magazine 11, and empty space 25 into the changing magazine 17. This status is depicted in step d). The machine magazine 11 and changing magazine 17 are then each moved one step over, in opposite directions from one another, so that the status in step c) once again exists. The result of this method according to FIG. 3 is to decrease the retooling time required for complete replacement of all tools to about a quarter of that using the method described with reference to FIG. 2. The reason is not only that two tools are now being exchanged simultaneously but in opposite directions each time, but also that both magazines 11 and 17 are each being moved one step over, simultaneously and in opposite directions.

It should also be noted here that the tool changers 24 and 26 according to FIG. 3 can be constructed as simple sliders, while the tool changer 24 from FIG. 2 can effect a tool change in both directions. Thus the design complexity of a machine tool according to FIG. 3 is once again simplified as compared to a machine tool according to FIG. 2.

Figure 4:
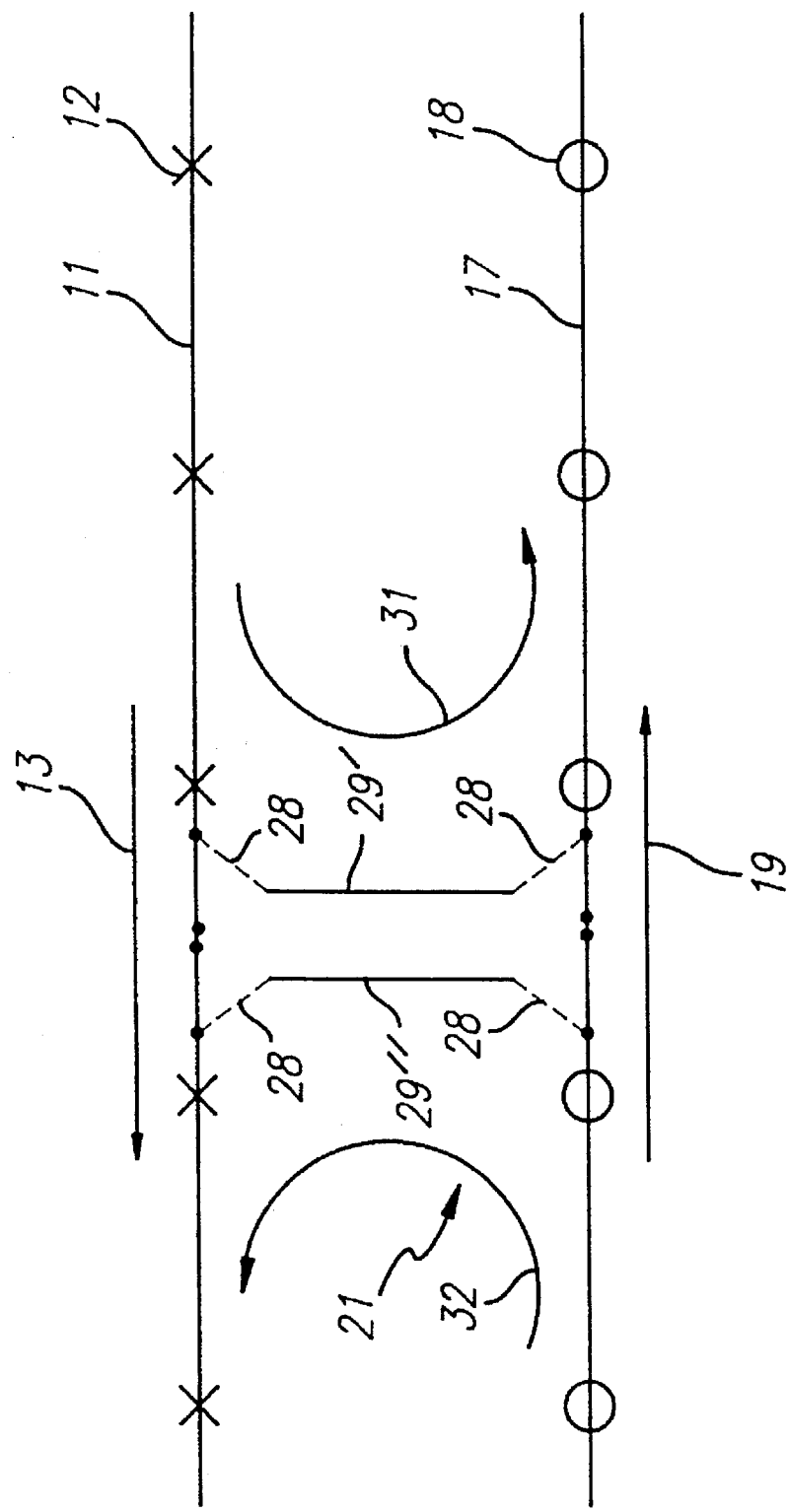
FIG. 4 shows a schematic depiction of the transfer apparatus with the machine tool from FIG. 1, with magazine switches provided.

Lastly, FIG. 4 shows, in a further exemplary embodiment, a transfer apparatus 21 comprising a total of four magazine switches 28. In the position drawn with solid lines in FIG. 4, the magazine switches 28 connect together the respective left and right sides of the machine magazine 11 and changing magazine 17. However, when the magazine switches are pivoted, for tool changing, into the position drawn with dashed lines in FIG. 4, they connect the machine magazine 11 and changing magazine 17 together, via magazine connectors 29, in such a way that the two magazines 11 and 17 are, so to speak, connected in series.

The tools 12 from the machine magazine 11 then move via the magazine connection 29' along the removal direction 31 into the changing magazine 17, while at the same time the tools 18 to be inserted move via the machine connection 29" into the machine magazine 11, following the path indicated by an arrow 32. Because the magazines 11 and 17 are connected in series, and because the tools in the machine magazine 11 are being moved in the opposite direction from the tools in the changing magazine 17, the tools 12 and 18 are moved respectively out of and into the machine magazine 11 at the pace of the usual movement. Leaving aside the changeover times for the magazine switches 28, the retooling time now depends only on the speed at which the tools 12 and 18 are moved.

It should also be mentioned that in the exemplary embodiment according to FIG. 4 an additional empty space is not needed, and the magazines 11 and 17 can, so to speak, be seamlessly appended to one another. Accordingly, there is also no need for a tool changer.

It is also possible to arrange a plurality of changing magazines 17 one above the other in the Z axis so as to move vertically, so that the machine magazine 11 can be loaded selectively from one changing magazine.

We claim:

1. A machine tool, comprising:

a machine magazine that receives a plurality of tools and that selectively moves said tools in a first transport direction;

a changing magazine that receives a plurality of tools and that selectively moves said tools in a second transport direction opposite to said first transport direction, which tools are to be inserted into or removed from said machine magazine; and at least one transfer apparatus that changes tools between said machine magazine and said changing magazine;

wherein said transfer apparatus includes magazine switches that are moved to selectively connect each of the left side and the right side of the machine magazine and the changing magazine, such that the machine magazine and the changing magazine are thereby connected in series during tool changing to permit sequential movement of tools from said machine magazine to said transfer apparatus to said changing magazine, and vice versa.

2. A machine tool according to claim 1, wherein the machine magazine and the changing magazine are adapted to alternately move in stepwise fashion.

3. A machine tool according to claim 1, wherein the machine magazine and the changing magazine are adapted for simultaneous movement.

4. A machine tool according to claim 3, wherein said transfer apparatus includes two tool changers that simultaneously transfer tools, respectively, from said machine magazine to said changing magazine, and vice versa.

5. A method for changing tools between a machine magazine associated with a machine tool and a changing magazine, comprising:

moving a machine magazine with a plurality of tools in a first transport direction;

moving a changing magazine, which is adapted to transfer tools between the changing magazine and the machine magazine, in a second transport direction;

moving the tools in the machine magazine and the changing magazine in opposite directions; and changing the tools between the machine magazine and the changing magazine by connecting the machine magazine and the changing magazine in series, and moving the tools in the machine magazine and the changing magazine simultaneously but in the opposite directions, such that a queue of tools runs from the machine magazine into the changing magazine and vice versa.

6. A method for changing tools between a machine magazine associated with a machine tool and a changing magazine using a transfer apparatus, comprising:

moving a machine magazine with a plurality of tools in a first transport direction;

moving a changing magazine with at least one tool in a second transport direction;

moving the tools in the machine magazine and the changing magazine in opposite directions; and changing the tools with the transfer apparatus between the machine magazine and the changing magazine by connecting the machine magazine and the transfer apparatus and the changing magazine in series to permit sequential transfer of tools between the machine magazine and the transfer apparatus, and between the transfer apparatus and the changing magazine, and by moving the tools in the machine magazine and the changing magazine in opposite directions.

* * * * *

UNITED STATES PATENT AND TRADEMARK OFFICE
CERTIFICATE OF CORRECTION

PATENT NO. : 5,474,514

DATED : December 12, 1995

INVENTOR(S) : Eugen Rutschle and Hans-Henning Winkler

It is certified that error appears in the above-identified patent and that said Letters Patent is hereby corrected as shown below:

Title page, item [75] Inventors: Engen Rutschle (should be)
Eugen Rutschle

Signed and Sealed this

Ninth Day of April, 1996

Attest:

BRUCE LEHMAN

Attesting Officer

Commissioner of Patents and Trademarks